United States Patent [19]

Hendrikx et al.

[11] Patent Number: 4,865,705

[45] Date of Patent: Sep. 12, 1989

[54] NON-AUTO CROSSLINKING BINDER COMBINATION, AQUEOUS COATING COMPOUND CONTAINING THE SAME AND ITS USE

[75] Inventors: Georg Hendrikx, Velbert; Hans-Peter Patzschke; Armin Gobel, both of Wuppertal, all of Fed. Rep. of Germany

[73] Assignee: Herberts Gesellschaft mit beschrankter Haftung, Wuppertal, Fed. Rep. of Germany

[21] Appl. No.: 86,719

[22] Filed: Aug. 18, 1987

[30] Foreign Application Priority Data

Aug. 19, 1986 [DE] Fed. Rep. of Germany ....... 3628119

[51] Int. Cl.$^4$ ...................... B01D 17/06; C08G 63/52
[52] U.S. Cl. ................... 204/181.7; 524/901; 525/377; 528/303; 528/332
[58] Field of Search .......................... 204/181.7, 181.4; 528/302, 303, 332; 525/377; 524/901

[56] References Cited

U.S. PATENT DOCUMENTS

| | | | |
|---|---|---|---|
| 3,458,420 | 7/1969 | Spoar et al. | 204/181.7 |
| 3,988,281 | 10/1976 | Minami et al. | 525/375 X |
| 4,220,568 | 9/1980 | Patzschke | 528/302 X |
| 4,458,054 | 7/1984 | Schmözer | 528/341 X |
| 4,477,530 | 10/1984 | Diefabach et al. | 427/27 X |

*Primary Examiner*—Stephen J. Kalafut
*Attorney, Agent, or Firm*—Michael O. Warnecke; Donald A. Peterson

[57] ABSTRACT

A non-autocrosslinking binder composition for water dilutable lacquers is described, containing from 95 to 50 parts by weight of a water dilutable poly(meth)acrylate resin containing amino and hydroxyl groups and from 5 to 50% by weight of crosslinking agents is described. An aqueous electrodip lacquer coating composition capable of being deposited at the cathode and its use for coating articles having an electrically conductive surface at the cathode are also described.

9 Claims, No Drawings

NON-AUTO CROSSLINKING BINDER COMBINATION, AQUEOUS COATING COMPOUND CONTAINING THE SAME AND ITS USE

BACKGROUND OF THE INVENTION

1. Field of the Invention

This invention relates to a non-auto crosslinking binder compositions containing poly(meth)acrylate resins in water dilutable lacquers which are preferably capable of being deposited electrophoretically, and to aqueous electrodip lacquer coating compounds [KTL baths (cathodic dip coating baths)] capable of being deposited at the cathode and their use for coating articles.

2. Description of the Related Art

Electrodip lacquer coating compounds are used on a large technical scale as primers. They are also referred to as electrophoresis lacquers or EC (electrocoating) lacquers.

Binders based on poly(meth)acrylate resin used for the formation of color stable lacquer coats of the kind required, for example, for the domestic appliances industry have not hitherto attained the level of protection against corrosion which has been achieved with amino epoxy resins in the motor car industry.

Thermal crosslinking of these systems is carried out by various processes, e.g. by reactions of functional groups in the basic resin with formaldehyde condensation resins, blocked polyisocyanates or transesterifiable crosslinking agents. Depending on the customers requirements, not all the wishes concerning the properties of the lacquer are fulfilled.

In DE-A No. 34 36 346 there are described aqueous, non-yellowing electrodip lacquer coating compounds containing, as basic resin, synthetic resin binders containing primary and/or secondary hydroxyl groups and primary, secondary and/or tertiary amino groups, such as amino-poly(meth)acrylate resins having a hydroxyl number of from 80 to 250 (mg KOH per g of solid resin), an amine number of from 30 to 150 (mg KOH per g of solid resin) and an average molecular weight ($\overline{M}n$) of from 250 to 10,000. This resin system has the disadvantage of not providing sufficient protection against corrosion, especially at the edges and corners of the coated articles.

SUMMARY OF THE INVENTION

It is an object of the present invention to provide non-auto crosslinking binder compositions for water dilutable, non-yellowing lacquers and in particular aqueous electrodip lacquer coating compositions capable of being deposited electrophoretically, which compositions are improved covering of the edges when deposited electrophoretically at the cathode and subsequently rinsed with water and stoved.

It has surprisingly been found that this problem may be solved by providing a binder composition of a special water dilutable poly(meth)acrylate resin containing amino and hydroxyl groups (component A)) and a crosslinking agent (component B)).

The present invention thus relates to the non-auto crosslinking binder compositions of (A) poly(meth)acrylate resins substitute with amino and hydroxyl groups and (B) a crosslinking agent, and optionally component (C) comprising a paste binder resin, as described herein and in the appended claims which are useful in preparing water dilutable lacquers, the electrophoretically depositable aqueous coating compositions compounds prepared from said binders and methods for their use for coating articles.

DETAILED DESCRIPTION OF THE INVENTION

Broadly the present invention includes non-auto crosslinking binder compositions for water dilutable lacquers, comprising
(A) 95 to 50% by weight of water dilutable poly(meth)acrylate resin containing amino and hydroxyl groups, obtainable from free radically polymerizable
 (a) monomers containing amino groups and
 (b) monomers containing hydroxyl groups or
 (ab) monomers containing amino groups and hydroxyl groups and, in each case,
 (c) monomers not containing reactive groups and
 (d) polyunsaturated monomers,
from 6 to 40 parts by weight of component (a) and from 4 to 50 parts by weight of component (b) or from 8 to 60 parts by weight of component (ab) being used per 9.9 to 80 parts by weight of component (c) and per 0.1 to 10 parts by weight of component (d), and
(B) 5 to 50% by weight of a crosslinking agent.

Component (A) used according to the invention is a hydroxyl group-containing poly(meth)acrylate resin in which polyunsaturated monomers are incorporated by polymerization and which is water soluble or dilutable with water after it has been neutralized with acids.

The polymer resin of component (A) containing basic groups is prepared by solution polymerization and has a hydroxyl number of, preferably, from 30 to 450, most preferably from 50 to 100 mg KOH per g of solid resin. The number average molecular weight ($\overline{M}n$) of the resin is preferably in the range of from 500 to 50,000, most preferably from 1,000 to 10,000 (determined by gel permeation chromatography calibrated with polystyrene fractions). Its viscosity is preferably in the range of from 0.1 to 10 Pa.s, most preferably particular from 0.5 to 5 Pa.s (Pascol seconds) as a 50% solution in monoglycol ethers (in particular butoxyethanol) at 25° C. Its glass transition temperature (calculated from the glass transition temperatures of the homopolymers) is preferably in the range of from −50° to +150° C., most preferably from −20° to +50° C.

The suitable average molecular weights and viscosities may also be obtained by adding or blending resins having a higher or lower molecular weight or viscosity.

The polyacrylate resins containing basic groups may be prepared according to the state of the art as described, for example, in Nos. DE-A-15 46 854, DE-A-23 25 177 or DE-A-23 57 152. Suitable ethylenically unsaturated monomers include virtually all radically polymerizable monomers but with the usual restrictions for copolymerizations as laid down by the Q- and e-Scheme of Alfrey and Price and prescribed by the Copolymerization parameters (see Brandrup and Immergut, Polymer Handbook, 2nd Edition, John Wiley and Sons, New York 1975). Since component (A) is a basic poly(meth)acrylate resin containing amino groups, the resin may be diluted with water after neutralization with organic acids.

A copolymer of this type containing amino groups and hydroxyl groups is preferably prepared by polymerization in solution. It has an amine number preferably of from 30 to 150, most preferably of from 45 to 100 mg KOH per g of solid resin.

Component (A) may be prepared from free radical polymerizable monomers containing amino groups and radically polymerizable monomers containing hydroxyl groups together with free radical polymerizable monomers not containing reactive groups, or it may be prepared from radically polymerizable monomers containing both amino groups and hydroxyl groups together with the free radical polymerizable monomers which are essentially free, preferably free from reactive groups.

For the preparation of component (A), either 6 to 40 parts by weight of the radically polymerizable monomers containing amino groups (component (a)) and 4 to 50 parts by weight of the radically polymerizable monomers containing hydroxyl groups (component (b)) or 8 to 60 parts by weight of the radically polymerizable monomers containing hydroxyl groups and amino groups (component (ab)) and 9.9 to 80 parts by weight of the radically polymerizable monomers not containing reactive groups apart from the ethylenic bond (component (c)) and from 0.1 to 7 parts by weight of polyunsaturated monomers (component (d)) may be used.

The monomers containing amino groups are suitably monomers corresponding to the general formula $$R-CH=CR'-X-A-N(R'')_2$$

wherein
$R = R'$ or $X-C_nH_{2n+1}$
$R' = H$ or $C_nH_{2n+1}$
$R'' = R'$, $C_nH_{2n}OH$ and/or $C_nH_{2n}NR_2$
$X = COO-$, $CONH$, $CH_2O-$ 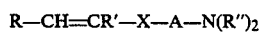 $O-$
$A = C_nH_{2n}$ or

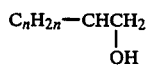

and
$n = 1$ to 8, preferably 1 to 3.

The following are examples of unsaturated monomers containing N groups: N-dialkyl- or N-monoalkylaminoalkyl(meth) acrylates and the corresponding N-alkanol compounds such as, for example, N-diethylaminoethylmethacrylate or N-tert-butyl-aminoethylacrylate, N-dialkyl- or N-monoalkyl-aminoalkyl(meth)acrylamide or the corresponding N-alkanol compounds such as, for example, N-dimethyl-aminoethanol-acrylamide and/or heterocyclic compounds containing vinyl groups as well as one or more basic nitrogen atoms, such as N-vinylimidazole.

Free radical polymerizable monomers containing hydroxyl groups are understood to be monomers which in addition to containing a polymerizable ethylenically unsaturated group contain at least one hydroxyl group on a $C_2$ to $C_{20}$ straight chained, branched or cyclic carbon structure. These are mainly unsaturated esterification products corresponding to the following general formula:

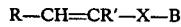

wherein
R,R' and X have the meanings defined above and B denotes a straight chained or branched $C_1$ to $_6$ alkyl group containing 1 to 3 OH groups.

(Meth)acrylic acid hydroxyalkyl esters are particularly suitable, e.g. 2-hydroxyethylacrylate, 2-hydroxypropylmethacrylate, butane-1,4-diol-monoacrylate, 2,3-dihydroxypropylmethacrylate, pentaerythritol monomethacrylate, polypropylene glycol monoacrylate and fumaric acid dihydroxyalkyl esters. N-hydroxyalkyl(meth)acrylamides and N-hydroxyalkyl fumaric acid mono- or di-amides such as N-hydroxyethyl-acrylamide or N-(2-hydroxypropyl)-methacrylamide may also be used. Special elastic properties may be obtained by using a reaction product of hydroxy alkyl(meth)acrylate and ε-caprolactone. Other suitable compounds containing hydroxyl groups include allyl alcohol, monovinylethers of polyhydric alcohols, especially diols such as the monovinyl ether or ethylene glycol or butane diol, and allyl ethers or esters containing hydroxyl groups, such as 2,3-dihydroxypropyl-monoallyl ether, trimethylol propanemonoallyl ether or 2,3-dihydroxypropanoic acid allyl ester. Hydroxyethyl-, hydroxypropyl- and/or butane diol-1,4-(meth)acrylate are particularly suitable.

The choice of free radical polymerizable monomers not containing additional reactive groups is made according to the mechanical properties of the film and the compatibility of the resin combination used. Acrylic acid alkyl esters, methacrylic acid alkyl esters, and maleic and/or fumaric acid dialkyl esters are used in which the alkyl groups have 1 to 20 carbon atoms and are arranged in a straight or branched aliphatic chain and/or as cycloaliphatic and/or (alkyl) aromatic groups. "Hard" monomers which have a high glass transition temperature as polymers include, for example, monomers of the vinyl aromatic type such as styrene, α-substituted styrenes such as α-methyl styrene, o-, m- and p-alkyl styrenes such as vinyl toluene or p-tert-butyl styrene, halogenated vinyl benzenes such as o- or p-chloro styrene, short chained methacrylic acid esters such as methyl methacrylate, ethyl methacrylate, propyl methacrylate, butyl methacrylate, cyclohexyl methacrylate, isobornyl methacrylate, or dihydrodicyclopentadienyl methacrylate, (Meth)acrylamide and/or (Meth)acrylonitrile. "Soft" monomers are acrylic acid esters with a long alcohol chain, such as n-butyl acrylate, isobutyl acrylate, tert-butyl acrylate, 2-ethyl hexyl acrylate and/or lauryl acrylate. Unsaturated ethers such as ethoxyethyl methacrylate or tetrahydrofurfuryl acrylate may also be used. Monomers of the vinyl ester type, especially vinyl esters of α-branched monocarboxylic acids, in particular of versatic acid vinyl esters, may also be incorporated by polymerization if suitable reaction conditions and reaction comonomers are used.

Ethylenically polyunsaturated monomers are understood to be compounds having at least 2 radically polymerizable double bonds as represented by the general formula

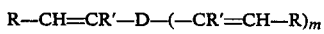

wherein
m = 1 to 3, preferably m = 1
and, in addition to the meanings already given above, D denotes the general basic chemical structure carrying the reactive double bond. Examples of D include the o-, m- and p-phenylene group and groups of the formula —X—alkyl-X'—, wherein alkyl preferably has 2 to 18 carbon atoms, and X and X' denote identical or different linking groups such as —O—, —CONH—, —COO—, NHCOO— or —NH—CO—NH. The symbol D may denote, for example, a benzene ring as in divinyl benzene which may be substituted, as in p-methyldivinyl benzene or o-nonyldivinyl benzene. Further examples of suitable polyunsaturated monomers include reaction products of polyhydric alcohols, especially dihydric alcohols with α, β-unsaturated carboxylic acids as already defined above. Examples include ethane diol diacrylate, ethylene glycol dimethacrylate, butane-1,4-diol diacrylate, hexane-1,6-diol discrylate, neopentyl glycol dimethacrylate, triethylene glycol dimethacrylate, polyglycol-400-diacrylate, glycerol dimethacrylate, trimethylol propane triacrylate and/or pentaerythritol diacrylate. Polyfunctional monomers containing urethane and amide groups are prepared by the reaction of, for example, hexane diisocyanate or methacrylic acid-β-isocyanato ethyl ester with hydroxy ethyl(meth)acrylate or (meth)acrylic acid. Examples of other suitable compounds having a different structure include allyl methacrylate, diallyphthalate, butanediol divinyl ethers, divinyl ethylene urea, divinyl propylene urea, maleic acid diallyl ester, bis-maleic imides, glyoxa-bis-acrylamide and/or the reaction product of an epoxy resin with (meth) acrylic acid or fumaric acid semi esters. Difunctional unsaturated monomers such as butane diol diacrylate or hexane diol diacrylate are preferred. When glycidyl methacrylate and methacrylic acid are used, the corresponding glycerol dimethacrylate is automatically formed in the course of polymerization. The nature and quantity of polyunsaturated monomers should be carefully adjusted with the reaction conditions (catalysts, reaction temperature, solvents) in order that the desired high viscosity may be obtained without gel formation.

Copolymerization is carried out in known manner by solution polymerization with the addition of radical initiators and optionally molecular weight regulators at temperatures from 50° to 160° C. It is carried out in a liquid in which both the monomers and polymers dissolve. The monomer content or polymer content after polymerization is then about 50 to 90% by weight. Solution polymerization in organic solvents which are dilutable with water is preferred. Examples of such solvents include ethylene glycol, ethoxy ethanol, butoxy ethanol, diethylene glycol, triethylene glycol, diethylene glycol dimethyl ether, propylene glycol, methoxy propanol, ethoxy propanol, dipropylene glycol monomethyl ether, dipropylene glycol dimethyl ether, diacetone alochol, ethanol, isopropanol, sec. butanol, tert. butanol, acetone, methoxypropanone, dioxane, tetrahydrofuran, N-methyl-pyrrolidone or mixtures thereof. A proportion of water insoluble, high boiling solvents such as hexylene glycol, phenoxy ethanol, ethyl hexanol, isodecanol or 2,2,4-trimethyl pentane-1,3-diolmonoisobutyrate may also be included to improve leveling and lower the coating impedance. The solvent or solvent mixture is generally heated to the reaction temperature and the monomer mixture is then run in over a period of several hours. In order for the reflux temperature may be employed, the initiator is adjusted to the boiling point of the solvent mixture. It normally decomposes with half a life of from 30 minutes to 10 hours. The initiator is either dissolved cold in the monomer mixture or for safety reasons is added separately during the inflow of monomers. From 0.1 to 5% by weight, preferably from 0.5 to 3% by weight of peroxides and or azo compounds, based on the quantity of monomers, are added as catalysts which are soluble in organic solvents. The peroxides used may be, for example, benzoyl peroxide or di-tert-butyl peroxide, hydroperoxides such as tert-butylhydro peroxide or cumene hydro peroxide and per esters such as tert-butyl peroctoate or tert-butyl perbenzoate. Examples of azo compounds which are decomposed by heat include 2,2'-azo-bis-(2-cyano propane) and 1,1'-azo-bis-cyclohexane carbonitrile. Radical forming compounds of the dibenzyl type such as 1,2-bis-(4-methyl phenyl)-1,2-dicarbethoxy-1,2-dicyano ethane may also be used as initiators. The molecular weight may be lowered in known manner by means of regulators. Mercaptans, halogenated compounds and other radical transmitting substances are preferably used for this purpose. Particularly preferred are n- and tert.-dodecyl mercaptan, tetrakis-mercaptoacetyl-pentaerythritol, tert-butyl-o-thiocresol, thiosalicylic acid, buten-1-ol and dimeric α-methyl styrene.

The amino-(meth)acrylate resins may also be prepared by a polymer analogous reaction. Thus, for example, a copolymer containing acrylamide groups may be reacted with formaldehyde and a secondary amine and/or amino alcohol. A particularly preferred process is described in DE-A No. 34 36 346. In this process, monoethylenically unsaturated monomers containing epoxide groups are first incorporated in the copolymer by polymerization. The product is then reacted with excess ammonia, primary and/or secondary monoamines and/or mono amino alcohols and the amine excess is subsequently distilled off. A similar reaction may be carried out with preferably equivalent quantities of ketimines of polyamines containing a secondary amino group and one or more primary amino groups, such as the mono ketimine of methylisobutyl ketone and methylamino propylamine or the diketimine of methylisobutyl ketone and diethylene triamine. Radically polymerizable, monoethylenically unsaturated monomers containing epoxide groups include mono-and/or di-glycidyl compounds of α,β-unsaturated acids, acid amides, alcohols or amines such as glycidyl esters of (meth)acrylic acid, of fumaric acid and/or maleic acid, and of fumaric-and/or-maleic-acid monoalkyl esters, and glycidyl compounds of (meth)acrylic acid amide, fumaric acid diamide, maleic acid diamide or maleic imide and/or glycidyl ethers of unsaturated alcohols such as vinyl alcohol and/or allyl alcohol. Other suitable compounds include monoglycidyl esters of dicarboxylic acid monoesters with unsaturated alcohols such as phthalic acid allyl-glycidyl ester. Vinyl esters and allyl esters of epoxidized fatty acids may also be used, e.g. 2,3-epoxybutyric acid allyl ester or epoxy-stearic acid allyl ester. Diolefines in which a double bond has been epoxidized are also suitable, such as vinyl-ethylene oxide, 1-methyl-1-vinyl-ethylene oxide or 3,4-epoxy-1-vinyl-cyclohexane. Glycidyl acrylate and glycidyl methacrylate are preferred for copolymerization. The proportion of unsaturated monomers containing epoxide groups in the copolymer is generally from 8 to 50% by weight. The lower limit is preferably 12% by weight and the upper limit 35% by weight. Polymerization must have run to completion before the reaction with amines takes place because otherwise reversible side reactions with the secondary amines take place on the activated double bonds of the monomers.

Particularly suitable secondary amines for the reaction with the epoxide groups are those corresponding to the formula

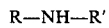

R—NH—R' wherein

R=H or R',

R'=$C_nH_{2n+1}$, $C_nH_{2n}OH$ and/or $C_nH_{2n}$—N=C (alkyl)$_2$, and n=1 to 8, preferably 1 or 2, and the alkyl group has 1 to 8 carbon atoms.

The following are examples of amines which may be used for the reaction: $C_1$ to $C_6$ dialkyl amines having identical or different alkyl groups in the molecule, such as dimethyl, diethyl, diisopropyl, dibutyl-, methyethyl-, methylpropyl- and methylbutyl- amine, monocycloaliphatic amines such as morpholine, piperidine or pyrrolidine and/or monoalkanolamines such as N-methylamino ethanol and/or dialkanolamines such as diethanolamine, or diisopropanolamine. Examples of primary amines and amino alcohols include $C_1$ to $C_8$ alkyl amines such as ethylamine or 2-ethylhexylamine and amino ethanol. $C_1$ to $C_4$ alkyl groups, in particular $C_1$ and/or $C_2$ alkyl groups are preferred in all cases. Secondary amines such as dimethylamine, diethylamine, methylethylamine or N-methyl-amino ethanol, are particularly preferred because they give rise to readily soluble ET baths with a high pH after neutralization. The primary amines mentioned above are in most cases used in admixture with secondary amines because the products would otherwise be too highly viscous.

The number of primary and/or secondary hydroxyl groups is optimized so that when the lacquer is stoved, a highly crosslinked, solvent resistant film is obtained. Since one secondary OH group is formed from each epoxide group in the reaction with amine, it is suitable to incorporate at least one additional hydroxyl group per molecule by polymerization, preferably primary hydroxyl groups by way of other, unsaturated monomers. The number of epoxide groups determine the number of amino groups which enter into reaction with the epoxide groups and hence also the solubility of the product. At least one epoxide group per molecule should be present. It is in many cases advantageous to combine a high hydroxyl number with a low degree of neutralization and a very high pH.

The non-auto crosslinking aminopoly(meth)acrylate resins free from epoxide groups described above are used as binders for cathodic deposition in ET (electrocoating) baths [KTL (cathodic dip coating) baths].

In addition to containing amino- and hydroxypoly(meth) acrylate resins (component (A)) the binder combination according to the invention contains crosslinking agents, referred to as component (B). The usual additives may also be present, as described in detail in the above mentioned Patent specifications relating to KTL (cathodic dip coating) baths, which may also in part be referred to in more detail below. Paste binders may also be added as component (C). Examples of component (B) include formaldehyde condensation resins (urea- melamine-, benzoguanamine- and/or phenolformaldehyde resins), blocked isocyanates and/or resins containing transesterifiable ester groups, with the addition of conventional catalysts. Blocked aliphatic or cycloaliphatic polyisocyanates or resins containing transesterifiable ester groups or mixtures thereof are preferred for making use of the advantageous properties of the amino-poly(meth)acrylate resin and obtaining ET (electrocoating) baths with as high a pH as possible.

From 50 to 5% by weight of crosslinking agents are used for 50 to 95% by weight of component (A), as in accordance with the state of the art. The crosslinking agents used may be the products known in the art (see the literature references given above). Up to 30% by weight of hydroxy functional resins capable of reacting with the crosslinking agents (see e.g. EP-A No. 0 04 090) may be incorporated by emulsification in the KTL baths obtained with the binders according to the invention.

The ratio in which components (A) and (B) are mixed is preferably in the range of from 90:10 to 60:40 and is determined empirically from the optimum application technical properties obtainable at the given stoving temperature. It may be advantageous to use a combination of several crosslinking systems.

The crosslinking agent has an average molecular weight ($\overline{M}n$) of about 250 to 5,000, especially from 500 to 3,000. Optimum properties are obtained by mixing from 5 to 95% by weight of blocked polyisocyanate with 95 to 5% by weight of transesterifiable crosslinking agent, based on the sum of crosslinking agents and calculated as solid resin content. A ratio of blocked polyisocyanates to transesterifiable crosslinking agents in the range of from 1:4 to 4:1 and especially from 1:2 to 2:1 is particularly preferred.

Blocked polyisocyanates are prepared by reacting a multifunctional isocyanate with at least a stochiometric quantity of a monofunctional compound containing active hydrogen (zerewitinoff reaction), optionally with the addition of basic catalysts such as tertiary amines or small quantities of tin salts such as dibutyl tin dialaurate. The isocyanate group is thereby protected against reactions with water or alcohols at room temperature. The reaction product obtained undergoes reaction with the hydroxyl groups of the aminopoly(meth)acrylate resin when heated so that the protective group is split off. It splits off at stoving temperatures below 210° C., preferably below 190° C., most preferably below 180° C. but above 110° C., preferably above 140° C., most preferably above 150° C., so that the isocyanate group released is capable of reacting with the basic resin. The agents which block the isocyanates contain only a single amine, amide, lactam, thiol or hydroxyl group. Thus, for example, aliphatiac and cycloaliphatic alcohols such as 2-ethyl hexanol, dialkyl amino alcohols such as dimethyl amino ethanol, oximes such as methyl ethyl ketoxime, lactams such as ε-caprolactam and pyrrolidone-2, imides such as phthalimide or N-hydroxymaleic imide, hydroxy alkyl esters, and malonic or aceto acetic acid esters have proved to be suitable but β-hydroxyglycols or-glycol ethers and glycol amides are also recommended.

Suitable typical multifunctional isocyanates include aliphatic, cycloaliphatic and/or aromatic polyisocyanates containing at least two isocyanate groups per molecule. Suitable aromatic diisocyanates include the isomers and the isomeric mixtures of phenylene diisocyanate, tolylene diisocyanate, xylylene diisocyanate, biphenylene diisocyanate, naphthylene diisocyanate and diphenyl methane diisocyanate, diphenyl tetra isocyanate, and naphthyl tetra isocyanate. (Cyclo)aliphatic diisocyanates give rise to products with little tendency to yellowing by virtue of their high resistance to ultraviolet light. Examples of such diisocyanates include isophorone diisocyanate, cyclopentylene diisocyanate, and the hydrogenation products of aromatic diisocyanates such as cyclohexylene diisocyanate, methylcyclohexylene diisocyanate and dicyclohexyl methane diisocyanate. Aliphatic diisocyanates are compounds corresponding to the formula

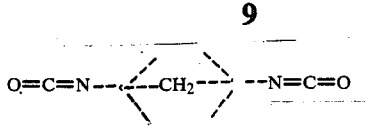

wherein r denotes an integer with a value from 2 to 20 in particular from 6 to 8, and the groups denoted by R, which may be identical or different, are hydrogen or a lower alkyl group with 1 to 8 carbon atoms, preferably 1 or 2 carbon atoms. Examples include trimethylene diisocyanate, tetramethylene diisocyanate, pentamethylene diisocyanate, hexamethylene diisocyanate, propylene diisocyanate, ethyl ethylene diisocyanate, dimethylene diisocyanate, methyltrimethylene diisocyanate and trimethylhexane diisocyanate. Isophorone diisocyanates and dicyclohexylmethane diisocyanates are particularly preferred diisocyanates.

Vinyl polymers which in addition to containing isocyanate groups, e.g. in addition to containing cyanatoethyl(meth)acrylate or dimethyl-isopropylbenzyl isocyanate, contain alkyl(meth)acrylates and/or (alkyl)vinyl benzenes as comonomers may also be used.

Mixed aliphatic/aromatic compounds are also suitable.

Products obtained by the trimerization or oligomerization of diisocyanates or by the reaction of diisocyanates with polyfunctional compounds containing OH groups or NH groups have proved to be suitable triisocyanates. These include, for example, the trade products already described with reference to component (B). The average functionality may be lowered, if necessary, by the addition of monoisocyanates. Examples of such chain breaking monoisocyanates include phenylisocyanate, cyclohexyl isocyanate and stearyl isocyanate.

An increase in the molecule may also be obtained by a reaction with polyhydric alcohols containing tertiary amino groups, such as N-methyl diethanolamine, or triethanol amine, or polyamines containing tertiary amino groups, such as 3-(methyl)-3-(2-aminoethyl-)aminopropylamine. Chain breaking N-dialkyl-amino alcohols such as dimethyl amino ethanol or N,N-dialkyl-alkylene diamines such as dimethyl amino propylamine or N,N-diethyl-N'-methyl-1,3-ethane diamine may also be used to improve the solubility. Isocyanate-containing prepolymers based on polyglycol ethers, polyester polyols, polyether polyols, polycaprolactone polyols and/or polycaprolactam polyols may also be used to advantage. Aliphatic and cycloaliphatic polyisocyanates are preferred for producing one coat lacquers which are not subject to yellowing.

Another suitable type of crosslinking agent (component (B)) consists of a resin containing terminal or lateral esterified carboxyl groups which are substantially stable in a neutral, aqueous medium but react with one or more amino-poly(meth)acrylates containing hydroxyl groups (component (A)) in the basic medium of the deposited film at temperatures higher than about 140° C. In this reaction, the transesterifiable ester groups undergo esterification with the hydroxyl groups of the aminopoly(meth)acrylate resin and the more readily volatile "alcoholic protective groups" are split off. Substantially all the terminal or lateral carboxyl groups should be esterified with alcohols. Care should be taken to ensure an acid number below 20, preferably below 10, most preferably below 3 to prevent migration of the poly ester to the anode.

The reactivity of the ester is increased by giving it a suitable chemical structure, e.g. by increasing the electrophilic activity of the carboxyl group or by a negative inductive effect on the alcohol group.

Transesterification is assisted by the volatility of lower straight chained or branched primary monohydric alcohols or by 1,2-glycols optionally substituted by ether or ester groups. The lower the molecular weight of the alcohols split off in the process of transesterification, the lower are the losses due to this splitting off. Numerous crosslinking agents containing ester groups suitable for transesterification with OH groups and/or transamidation with $NH_2$ groups are described in the literature. In EP-A-0 04 090, for example, there are described polyurethane esters containing hydroxy alkyl ester groups such as lactic acid ester or amino alkyl ester groups as transesterifiable groups.

The crosslinking agents ay also consist of poly esters containing carboxyl groups which are blocked with substituted or unsubstituted 1,2-glycols to form √β-hydroxy compounds:

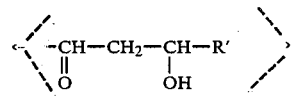

The 1,2-glycols used are advantageously substituted with saturated or unsaturated alkyl, ether, ester or amide groups, i.e. R' stands for

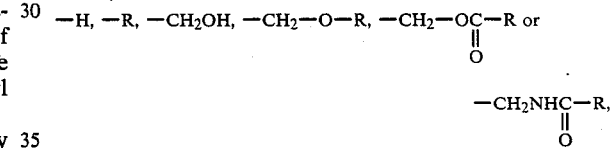

wherein N has a value of at least 2, preferably 3 to 10. R denotes a straight chained or branched alkyl group having 1 to 15 carbon atoms.

Crosslinking agents of this type are described in EP-A-No. 012 463 and DE-A-No. 31 03 642, e.g. as a reaction product of trimellitic acid anhydride with cardura E (R), the glycidyl ester of versatic acid (R).

Other crosslinking agents are prepared by the transesterification of dicarboxylic acid alkyl esters with polyhydric alcohols, e.g. a reaction product of trimethylol propane and dimethyl malonate, as described in EP-A-No. 082 291.

Other crosslinking agents capable of transesterification are obtained, as described in DE-A-33 15 469, by Michael Addition of aceto acetic acid alkyl esters or malonic acids dialkyl esters to resins containing double bonds which are activated by CO groups. The Michael Addition may be carried out stochiometrically or with the addition of excess double bonds.

Crosslinking agents containing carbalkoxy methyl ester groups are described in DE-A33 22 766.

Amine-formaldehyde condensation resins are formed by the reaction of aldehydes with urea, N-alkyl urea, dicyandiamide, various triazines such as melamine, benzoguanamine or acetoguanamine or mixtures thereof. The aldehydes may be monofunctional or polyfunctional. Examples include formaldehyde and its polymerization products, such as paraformaldehyde, polyoxymethylene, trioxane, and aliphatic and cyclic aldehydes, such as glyoxal, acetaldehyde, acrolein, propionaldehyde, butyraldehyde and furfural. The resins obtained have different molecular weights and reactivities according to the reaction conditions and degree of methylolation. Condensation with formaldehyde, furfural, paraformaldehyde, polyoxymethylene or trioxane is generally carried out with the addition of weak acids or a bases as catalysts. Strong acids are used for condensations with acrolein, glyoxal, acetaldehyde, propionaldehyde or butyraldehyde. In these reactions the primary reaction product is neutralized and aldehyde is then added and the reaction is continued with the addition of weak acids or bases. The preferred aldehyde is formaldehyde. The alcohol groups, preferably methylol groups, of the aldehyde condensation products are partially or, preferably, completely etherified with alcohols. Amine-formaldehyde resins in which the major proportion of methylol groups have been reacted with monohydric alcohols or mixtures thereof are preferred. Methanol, ethanol, propanol, butanol, heptanol, benzyl alcohol and other aromatic alcohols, cyclic alcohols such as cyclohexanol and monoethers of ethylene glycols, such as ethoxy ethanol or butoxyethanol are particularly preferred. If alcohols having more than 4 carbon atoms are to be incorporated, the methylol group is first esterified with a lower alcohol and the higher alcohol is subsequently introduced by transesterification. The preferred alcohols are lower aliphatic monohydric alcohols such as methanol and/or butanol. Melamine resins which have been reacted with 3 to 6 mols of formaldehyde and subsequently completely etherified with methanol are particularly preferred. The resins are prepared according to the state of the art and offered as trade products by many firms. Etherification with hydroxy carboxylic acids such as hydroxybenzoic acid, salicylic acid, or dimethylol propionic acid gives rise to melamine resins containing carboxyl groups whereas unsaturated melamine resins are obtained when hydroxy alkyl(meth)acrylates or allyl alcohol are used.

Crosslinking of poly(meth)acrylate resins containing OH groups with blocked polyisocyanates may be accelerated by the addition of from 0.01 to 2% by weight, especially from 0.5 to 1% by weight of strongly basic tertiary amines and/or active metal compounds based on the quantity of solid resin of component (A). A special, sometimes synergistic action is obtained by the combination of the basic medium of the deposited aminopoly(meth)acrylate resin with metal salts of bismuth, lead, cobalt, iron, antimony and/or tin-II and IV. Catalysts such as iron-III acetyl acetonate, dibutyl tin dilaurate, tri-n-butyl tin oxide, dibutyl tin dioctyl maleate, tin octoate, tin oleate, tetrabutyl titanate and/or cobalt 2-ethylhexanoate are particularly preferred.

A relatively high catalyst content is generally required for catalyzing the transesterification process. From 0.1 to 10% by weight, preferably from 2 to 6% by weight, based on components (A) and (B), of metal oxides, metal salts or metal complexes of monovalent or higher valent metals are suitably used. They are generally dissolved in aliphatic and aromatic hydrocarbons after salt formation with 2-ethyl-hexanoic acid or naphthenic acid. These solutions are emulsified in the electrophoresis bath. Another possibility lies in complex formation of the metals with acetyl acetonate, dicyclopentadiene, 8-oxy-hydroquinoline, 4-methyl-catechol and/or 2,5-dimercapto-1,3,4-thiodiazole. Examples of suitable catalysts include antimony trioxide, cobalt naphthenate, lead octoate, iron acetyl acetonate, the reaction product of zinc oxide+8-oxyhydroquinoline, thallium dicyclopentadiene and triethanolamine titanate. Lead octoate and zinc oxyhydroquinolate are preferred. The metal catalysts may also be incorporated by dispersion in a finely divided form as pigments such as lead silicate. Water dilutable metal salts are also suitable transesterification catalysts if the metal of the compound or complex is deposited in a finely divided form together with the lacquer. Catalysts which are only sparingly soluble in the ET bath and become uniformly distributed in the deposited film on stoving after electrophoretic deposition are preferred.

Components (A) and (B) may be mixed cold or precondensed at an elevated temperature. Components (A) and (B) react with each other to a certain extent without the mixture losing its capacity for being heat cured or its property of being rendered water soluble by protonation with acids.

To balance the various properties required for technical application, the electrophoretically depositable poly(meth)acrylate resin should contain, in addition to the crosslinking agent, up to 30% by weight, preferably from 5 to 20% by weight of a hydroxy functional resin capable of reacting with the crosslinking agents.

A special copolymer in the form of a paste resin may be used as component (C), for example a polymer of
(a) 80 to 95% by weight of a copolymer of
(a1) 0.5 to 40% by weight of N,N-Di-$C_1$ to 4-alkylamino-$C_1$ to 8-alkyl(meth)acrylamides and/or a mixture of N,N-Di-$C_1$ to 4-alkylamino-$C_1$ to 8-alkyl(meth)acrylates and N-substituted (Meth) acrylamides and/or (meth)acrylamide, in which the ratio of amino(meth)acrylates to amido(meth)acrylates should be from 1:2 to 2:1
(a2) 10 to 40% by weight of hydroxy-$C_2$ to 8-alkyl(meth)acrylates, and
(a3) 20 to 89.5% by weight of copolymerizable α, β-olefinically unsaturated compounds and
(b) 5 to 20% by weight of a polyisocyanate containing unmasked and optionally also masked isocyanate groups and biuret, urethane or isocyanurate groups.

The method of its preparation is described in Patent applications T31431 and T31520 filed by the same applicant on the same date.

Hydroxyfunctional resins having an OH number of from 30 to 500, especially from 50 to 300 and an average molecular weight ($\overline{Mn}$) of from 300 to 10,000, especially from 500 to 5,000, may be used as additional component to increase the throwing power. Examples of such resins include styrene-allyl alcohol copolymers, OH group-containing (meth)acrylic copolymers, caprolactone polyols, caprolactam polyols, urethane polyols, and OH group-containing polyethers and polyesters. OH group-containing copolymers are prepared by the copolymerization of unsaturated monomers containing hydroxyl groups with other ethylenically unsaturated monomers which do not contain additional reactive functional groups, as already described. The polyether polyols are understood to be compounds corresponding to the following general formula

wherein R=H or a lower alkyl group optionally carrying various substituents, n=2 to 6 and M=5 to 50. Polyoxytetramethylene glycols are examples. Polyester polyols may be obtained by the poly condensation of polycarboxylic acids or their anhydrides with organic poly alcohols or by the reaction of an ε lactone with polyalcohols. The polycarboxylic acids are usually aliphatic, cycloaliphatic or aromatic dicarboxylic acids and the polyalcohols are straight chained or branched aliphatic or cycloaliphatic polyols. Examples include branched polyesters of adipic acid, phthalic acid anhydride, trimethylol propane and butylene-1,4-glycol, or the reaction product of ε caprolactone with trimethylol propane. Polyurethane polyols are obtained by the reaction of aliphatic or cycloaliphatic polyalcohols, polyether polyols and/or polyester polyols. The various hydroxy functional resins may also be used as mixtures or have a segmental structure. Examples include the reaction products of 2 mol of polyglycol ether with 1 mol of a hydroxyl-containing polyester or 2 mol of polyglycol ether with 2 mol of dicarboxylic acid and 1 mol of hydroxyl-containing polyurethane. The resins contain the quantity of polar groups, preferably primary OH groups, required to enable them to be readily emulsified in the neutralized amino-poly(meth)acrylate resin (Component A). A small acid number or amine number, in each case below 30, especially below 20, preferably an amine number, may be incorporated to improve the compatibility and capacity for dilution with water. The resins are preferably so constructed that the components do not undergo yellowing when stoved.

The molecular weight range is so chosen that the resins are no longer volatile and yet provide good film formation due to improved fluidity. Precondensation, if employed, may be carried out in any sequence. Organic acids are used for neutralizing the basic poly(meth)acrylate resins.

The following are examples of acids: formic acid, acetic acid, propionic acid, lactic acid, citric acid, malonic acid, acrylic acid, phosphoric acid, and alkyl phosphoric acid. Monobasic low molecular weight organic carboxylic acids are preferred. It is necessary to add at least the quantity of neutralizing agent required to result in stable emulsification of the resin combination. An excess of neutralizing agent above the equivalent degree of neutralization should be avoided. The MEQ value (milli equivalents of neutralizing agent per 100 g of solid resin) is generally in the range of from 20 to 80. It is desirable to have as low an MEQ value as possible in order that a high deposition equivalent may be obtained.

The coating compound may in addition contain conventional lacquer technical additives such as anti pitting agents, leveling agents, anti foamants etc. The additives should, of course, be so chosen that they do not undergo unwanted reactions with water at the pH of the ET bath, do not introduce any unwanted foreign ions and when left to stand for some time do not precipitate in such a form that they can no longer be redispersed by stirring.

The coating compound may contain up to about 20% by weight of organic solvents for the purpose of lowering the viscosity, controlling the deposition voltage and improving the adherence and leveling. The organic solvent content should be as low as possible, especially below 15% by weight and mos preferably below 10% by weight. The solvents used may be alcohols, glycol ethers or keto alcohols, optionally with the addition of aliphatic and/or aromatic hydrocarbons of various chain lengths. When making a choice it should be borne in mind that the crosslinking agent is not water soluble and certain amounts of water insoluble solvents may facilitate and stabilize the dispersion process. As the solvent content increases, so the throwing power decreases, the thickness of the deposited layer increases and excess coating may occur. Water insoluble solvents have a greater effect in this respect than water soluble solvents. If aprotic solvents are required for the preparation of the resins, these may be replaced by other solvents after preparation of the product by distilling off the aprotic solvents.

The solids content of the coating compound according to the invention is suitably from 5 to 50% by weight after dilution with water. Adjustment of the lacquer to a relatively high solids content in the range of from 25 to 50% by weight, preferably from 30 to 45% by weight, results in stoving lacquers which can be diluted with water and may be applied to the object to be lacquered by processes such as immersion, spraying, roller application etc. If, on the other hand, the coating compound is diluted to a solids content of from 5 to 30% by weight, preferably from 10 to 20% by weight, then the lacquer obtained is suitable for electrophoretic deposition. The bath is constantly stirred to maintain a uniform temperature on the electrode surface and prevent deposition of insoluble constituents of the dispersion such as pigments. The pH of the lacquer is generally in the range of from 4.0 to 7.5, preferably from 5.0 to 6.5. Electrophoretic deposition should be carried out at the earliest 24 hours after preparation of the bath. During this period, the bath is advantageously stirred continuously to ensure uniform distribution. The bath temperature is advantageously kept at about 15° to 30° C. during the process of deposition. The solids content, the deposition temperature and time and the voltage are suitably chosen so that the desired layer thickness is obtained after the product has been rinsed with water and/or ultra filtrate and stoved at temperatures of about 150° C. to 230° C. Thus, for example, the layer thickness increases with increasing coating time and deposition voltage. When an electric current is applied at a voltage of, suitably, 50 to 500 volts between the metallically conductive workpiece and a counter electrode, the basic resin (component A)) is coagulated on the article to be lacquered at the cathode. In the process of coagulation, it carries along with it the water insoluble grinding resin and the crosslinking agents, pigments, catalysts, etc., with the result that the ratio of pigment to synthetic resin binder in the deposited film may shift in favor of the pigment. At the same time, water and the acid used for neutralization accumulate in the bath. Concentrated lacquers must therefore be used for refilling to compensate for this shift by altering the proportions. The same correction may also be made by means of suitable apparatus employed, for example, in the electrodialysis process or ultra filtration.

The copolymer component (C) may be pigmented in a ball mill, three roller mill or pearl mill at temperatures below 80° C. in the usual manner, either alone or with the addition of component (A) according to the invention. The usual inorganic and/or organic pigments, fillers, corrosion inhibitors and lacquer auxiliaries may be included, so long as they do not enter into any unwanted reactions in the aqueous medium, do not introduce any water soluble foreign ions and do not precipitate on ageing in such a manner that they can no longer be stirred up. The ratio of pigment to binder depends on the dispersibility and viscosity of the binder and is generally in the range of from 0.1:1 to 1.5:1. The pigments used and hence the ET baths containing them are preferably of the kind which produce the final color of the coated article and hence of the final lacquering. The lacquers are particularly suitable for the electrodip lacquering of metals and after stoving, preferably from 15 to 45 minutes at 160° C. to 190° C., they give rise to smooth, glossy, non-yellowing films with good age resistance, bonding strength, hardness and elasticity as well as resistance to corrosion.

Lacquers providing improved corrosion protection and especially improved protection at the edges may be obtained by virtue of the special resin structure of component (A).

EXAMPLE OF PREPARATION 1 (AMINO-POLY(METH)ACRYLATE RESIN A)

725 g of butoxyethanol are heated to 110° C. under an inert gas while a reflux condenser is switched on. A mixture of 20.7 g of butane diol diacrylate, 192 g of hydroxy ethyl acrylate, 137 g of butane diol monoacrylate, 251 g of glycidyl methacrylate, 364 g of 2-ethylhexyl acrylate, 439 g of butyl methacrylate, 438 g of methyl methacrylate, 90 g of styrene and 44 g of azo-bis-isobutyronitrile is added within 3 hours. The temperature is then maintained at 110° C. for one hour and 6 g of azo-bis-isobutyronitrile are added and this procedure is repeated after a further hour. A solids content of 71.2% by weight is obtained after 3 hours at 110° C. and after dilution to 50% by weight with butoxyethanol the viscosity is found to be 2650 mPa.s at 25° C. After cooling to 50° C., a mixture of 142 g of diethylamine and 142 g of isopropanol is rapidly added (1.10 mol of amine to 1.0 mol of epoxide). After 30 minutes, the mixture is heated to 65° C., kept at this temperature for one hour, then heated to 105° C. and kept at that temperature for 3 hours. After cooling to 80° C., isopropanol and excess amine are carefully distilled off under vacuum.

Final values:
Solids Content: 77.2% by weight (30 min 180° C.)
Amine number: 46 mg KOH per g of solid resin
Viscosity: 4.2 Pa.s (after dilution to 50% by weight with butoxyethanol)

EXAMPLE OF PREPARATION 2 (CROSSLINKING AGENT B) (BLOCKED POLYISOCYANATE)

666 g of isophorone diisocyanate and 134 g of trimethylol propane are mixed with 431 g of ethyl glycol acetate and heated to 60° C. within 1 hour with stirring and exclusion of atmospheric moisture. The initially insoluble and solid trimethylol propane melts and slowly reacts within a further hour while the temperature is raised to 90° C. The temperature is maintained at 90° C. for a further 3 hours to complete the reaction and an isocyanate equivalent weight of 410 is obtained. 366 g of ε-caprolactam are then added so slowly over a period of 3 hours that the reaction temperature does not rise above 100° C. This temperature is then maintained until the isocyanate number has fallen below 0.1%. The solvent is substantially distilled off under vacuum and the residue is diluted to 80% by weight with butoxyethanol.

EXAMPLE 1

220.3 g of amino-poly(meth)acrylate resin A, 85.5 g of a rutile pigment, 7.4 g of a commercial extender based on silicate and 18.0 g of ethoxy propanol are ground up in a pearl mill for 30 minutes at a temperature below 50° C.

79.6 g of crosslinking agent B are then added and the components are mixed in a dissolver with the addition of 9.4 g of formic acid (50%).

Completely desalted water is carefully added with stirring to dilute the reaction mixture to 2.0 liters.
Solids content: 14.5% (obtained after 25 minutes at 180° C.)
Milliequivalents of neutralizing agent per 100 g of solids content: 33.
Specific bath conductivity: 1,340 microsiemens.
A zinc phosphatized steel sheet (bonder 132 of Metallgesellschaft) is coated at a bath temperature of 30° C. and at 150 volt for 2 minutes.
A dry filmed thickness of 30 μm is obtained after rinsing with water and 25 minutes stoving at 180° C.

COMPARISON EXPERIMENT A

Method of preparation as in Example 1 with quantitative replacement of amino-poly(meth)acrylate resin A by the resin according to Example 2 of DE-A-34 36 345.

|  | Example 1 | Comparison Experiment A |
|---|---|---|
| 240 h SS* DIN 50021 |  |  |
| Faults in adhesion | 0.57 mm | 0.75 mm |
| Degree of blistering m/g* | 0/0 | 0/0 |
| Edge rusting | 0–1 | 3 |
| 360 h SS DIN 50021 |  |  |
| Faults in adhesion | 0.72 mm | 0.87 mm |
| Degree of blistering m/g | 0/0 | 0/0 |
| Edge rusting | 2 | 3 |
| 504 h SS DIN 50021 |  |  |
| Faults in adhesion | 0.79 mm | 1.00 mm |
| Degree of blistering m/g | 0/0 | 0/0 |
| Edge rusting | 2 | 3–4 |
| VDA-Changing test, WT 10 |  |  |
| Submigration | 3.5 mm | 3.5 mm |
| Degree of blistering m/g | 0.0 | 1 blister/size 3 |
| Edge rusting | 2–3 | 3–4 |

SS* = salt spray test
m/g* = quantity/size

We claim:
1. A non-auto crosslinking binder composition for aqueous electrolysis lacquer for cathodic deposition having improved edge covering characteristics, comprising
(A) 95 to 50% by weight of water dilutable poly(meth) acrylate resin containing amino and hydroxyl groups, obtainable from free radical polymerizable
  (a) monomers containing amino groups and
  (b) monomers containing hydroxyl groups or
  (ab) monomers containing amino groups and hydroxyl groups and, in each case,
  (c) monomers not containing reactive groups apart from ethylenic bonds and
  (d) polyunsaturated monomers having at least two double bonds,
  from 6 to 40 parts by weight of component (a) and from 4 to 50 parts by weight of component (b) or from 8 to 60 parts by weight of component (ab) being used per 9.9 to 80 parts by weight of component (c) and per 0.1 to 10 parts by weight of component (d), and
(B) 5 to 50% by weight of a crosslinking agent.
2. Non-auto crosslinking binder compositions according to claim 1, wherein crosslinking agent (B) is selected from the group consisting of transesterifiable crosslinking agents, blocked polyisocyanates, and formaldehyde condensation resins or mixtures thereof.

3. A non-auto crosslinking binder composition according to claim 1, in addition containing up to 30% by weight of a supplemental resin (C) comprising: a copolymer obtainable by the reaction of
(a) 80 to 90% by weight of a copolymer of
  (a1) 0.5 to 40% by weight of N,N-Di-$C_1$ to 4-alkylamino-$C_1$ to 8- alkyl(meth)acrylamides and/or a mixture of N,N-Di-$C_1$ to 4-alkylamino-$C_1$ to 8-alkyl(meth)acrylates and N-substituted(meth)acrylamides and/or (meth)acrylamide, the ratio of amino(meth)acrylates to amido(meth)acrylates being in the range of from 1:2 to 2:1,
  (a2) 10 to 40% by weight of hydroxy-$C_2$ to 8-alkyl(meth)acrylates, and
  (a3) 20 to 89.5% by weight of copolymerizable $\alpha,\beta$-olefinically unsaturated compounds and
(b) 5 to 20% by weight of a polyisocyanate containing unmasked and optionally also masked isocyanate groups and containing biuret, urethane or isocyanurate groups.

4. A non-auto crosslinking binder composition according to claim 1, wherein component (A) is a basic poly(meth)acrylate resin having an amine number of from 30 to 150, a hydroxyl number of from 30 to 450, and a number average molecular weight $\overline{M}n$ of from 2,000 to 200,000.

5. A non-auto crosslinking binder composition according to claim 1, wherein component (A) is a basic poly(meth)acrylate resin having an amine number of from 30 to 150, a hydroxyl number of from 30 to 450, a number average molecular weight $\overline{M}n$ of from 2,000 to 200,000, a viscosity of from 0.5 to 50 Pa.s in 50% solution in monoglycol ethers at 25° C. and a glass transition temperature of from −50° C. to +150° C.

6. A non-auto crosslinking binder composition according to claim 1, wherein component (A) is a non-auto crosslinking amino-poly(meth)acrylate resin which is essentially free from epoxide groups and has an amine number of from 30 to 150 and a hydroxyl number of from 30 to 450, obtainable by the reaction of a poly(meth)acrylate resin containing epoxide groups and having an average molecular weight $\overline{M}n$ of from 600 to 10,000 and an epoxy equivalent of from 300 to 4,000, with an excess of primary and/or secondary mono amines and/or amino alcohols to react substantially all the free epoxide groups and said resin is substantially free of unreacted, excess amine compounds.

7. An aqueous electrodip lacquer coating composition capable of being deposited cathodically from a cathodic dip coating bath, containing water, and synthetic resin binder according to claim 1, said resin containing amino groups capable of being rendered water soluble by protonation with acids, and containing one or more additives of the group of pigments, fillers, corrosion, inhibitors, lacquer auxiliaries, catalysts, and an organic solvent in a amount of up to 20% by weight, based on the total weight of said coating composition.

8. An aqueous electrodip lacquer coating composition capable of being deposited cathodically from a cathodic dip coating bath, containing water, and a synthetic resin binder with amino groups capable of being rendered water soluble by protonation with acids, in combination with crosslinking agents and optionally hydroxy functional resins and optionally containing one or more additives of the group of pigments, fillers, corrosion inhibitors, lacquer auxiliaries, catalysts, and organic solvents in an amount of up to 20% by weight, based on the total weight of coating compound, wherein said synthetic resin binder composition is the non-auto crosslinking binder composition according to claim 1.

9. A method of aqueous electrodip lacquer coating which comprises coating articles having an electrically conductive surface at the cathode with an aqueous cathodic electrodip lacquer composition of claim 7.

* * * * *

UNITED STATES PATENT AND TRADEMARK OFFICE
CERTIFICATE OF CORRECTION

PATENT NO. : 4,865,705

DATED : September 12, 1989

INVENTOR(S) : Hendrikx, et al.,

It is certified that error appears in the above-identified patent and that said Letters Patent is hereby corrected as shown below:

Column 3, line 34 in the formula, delete [13] and insert -- - or - --.

Signed and Sealed this

Eleventh Day of September, 1990

Attest:

HARRY F. MANBECK, JR.

*Attesting Officer*      *Commissioner of Patents and Trademarks*